US006274651B1

(12) United States Patent
Burrell

(10) Patent No.: US 6,274,651 B1
(45) Date of Patent: Aug. 14, 2001

(54) METHOD FOR REPAIRING, FILLING AND FABRICATING

(76) Inventor: Robert Burrell, 903 Strawberry Ave., Vineland, NJ (US) 08360

( * ) Notice: Subject to any disclaimer, the term of this patent is extended or adjusted under 35 U.S.C. 154(b) by 0 days.

(21) Appl. No.: 09/435,634

(22) Filed: Nov. 8, 1999

(51) Int. Cl.[7] .................................................. C08K 3/34
(52) U.S. Cl. ............................................ 523/521; 523/527
(58) Field of Search .................................... 523/521, 527

(56) References Cited

U.S. PATENT DOCUMENTS

| | | | | |
|---|---|---|---|---|
| 4,620,994 | * | 11/1986 | Suss | 427/407.1 |
| 5,468,831 | * | 11/1995 | Lenke | 528/44 |
| 5,606,003 | * | 2/1997 | Wang | 528/60 |

* cited by examiner

Primary Examiner—Paul R. Michl

(57) ABSTRACT

A method for repairing, filling and fabricating including the steps of providing a resin containing fiberglass; providing a polyester body fill material; providing a fiber strand body filler; mixing the resin, polyester body fill material and fiber strand body filler at room temperature to form a first mixture; providing a liquid clear fiberglass resin hardener; mixing the liquid clear fiberglass resin hardener with the first mixture at room temperature to form a first composition; providing a cream body filler hardener; and mixing the cream body filler hardener with the first composition at room temperature to form a second composition, the second composition having a putty-like consistency.

1 Claim, 1 Drawing Sheet

METHOD FOR REPAIRING, FILLING AND FABRICATING

BACKGROUND OF THE INVENTION

1. Field of the Invention

The present invention relates to a method for repairing, filling and fabricating and more particularly pertains to providing and utilizing an improved method for fiberglass repairing and for the filling in of cracks and holes in objects such as fiberglass, metal and the like and for fabricating objects.

2. Description of the Prior Art

Methods for repairing, filling and fabricating are known in the prior art. More specifically, methods for repairing, filling and fabricating heretofore devised and utilized for the purpose of repairing automobiles and other objects are known to consist basically of familiar, expected, and obvious structural configurations and methods, notwithstanding the myriad of designs encompassed by the crowded prior art which has been developed for the fulfillment of countless objectives and requirements.

By way of example, U.S. Pat. No. 4,529,757 to Iseler, Connolly and Shauh discloses a thermosetting resin patching compound. U.S. Pat. No. 4,322,334 to Arakawa, Nomaguchi and Iwami discloses low shrinkage unsaturated polyester resin compositions. U.S. Pat. No. 4,181,547 to Speer discloses a method for repairing plastic-like materials. U.S. Pat. No. 4,053,448 to Holle discloses a polyester based patching composition. U.S. Pat. No. 3,873,475 to Pechacek and Baratto discloses a composition for filling, patching and the like. Lastly, U.S. Pat. Des. 340,171 to Vigil discloses a windshield repair kit.

While these devices fulfill their respective, particular objectives and requirements, the aforementioned patents do not describe a method for repairing, filling and fabricating that allows a composition to be used in filling and repairing fiberglass objects that is durable, easy to work, and easy to remove when the repair surface is unclean.

In this respect, the method for repairing, filling and fabricating according to the present invention substantially departs from the conventional methods of the prior art, and in doing so provides a method primarily developed for the purpose of providing an improved method for repairing, filling and fabricating fiberglass objects.

Therefore, it can be appreciated that there exists a continuing need for a new and improved method for repairing, filling and fabricating which can be used for repairing, filling and fabricating fiberglass objects. In this regard, the present invention substantially fulfills this need.

SUMMARY OF THE INVENTION

In view of the foregoing disadvantages inherent in the known methods for repairing, filling and fabricating present in the prior art, the present invention provides an improved method for repairing and filling in of cracks and holes in objects such as fiberglass, metal and the like and for fabricating objects. As such, the general purpose of the present invention, which will be described subsequently in greater detail, is to provide a new and improved method for repairing, filling and fabricating which has all the advantages of the prior art and none of the disadvantages.

To attain this, the present invention essentially comprises a method for repairing, filling and fabricating. The method includes the steps of providing about twenty-five percent by weight of a liquid fiberglass resin; about twenty-five percent by weight of a polyester body fill material being comprised essentially of polyester resin, silica, styrene, talc and titanium dioxide; and about fifty percent by weight of a fibre strand body filler of a smooth formula being comprised essentially of calcium metasilicate, caster oil derivatives, milled fiberglass, polyester resin, styrene and talc. The method also includes the step of mixing the resin, polyester body fill material and fibre strand body filler at room temperature between 65 and 85 degrees Fahrenheit to form a first mixture. The method includes the step of providing a liquid clear fiberglass resin hardener for controlling the viscosity of -he mixture. Next, the method includes the step of mixing the liquid clear fiberglass resin hardener with the first mixture at room temperature between 65 and 85 degrees Fahrenheit to form a first composition having a viscosity greater than a viscosity of the first mixture. The higher the viscosity the faster the setting and drying time of the first composition. The lower the viscosity the slower the setting and drying time of the first composition. The method includes the step of providing a cream body filler hardener of a particular color having a weight percentage dependent upon the weight percentage of the fiber filler material. Finally the method includes the step of mixing the cream body filler hardener with the first composition at room temperature between 65 and 85 degrees Fahrenheit to form a second composition being created with the addition of a greater amount of cream body filler hardener that liquid clear fiberglass resin hardener, the second composition having a putty-like consistency.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the formulation of other compounds, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method for repairing and filling in of cracks and holes in objects such as fiberglass, metal and the like and for fabricating objects thereof which has all of the advantages of the prior art methods for repairing, filling and fabricating and none of the disadvantages.

It is another object of the present invention to provide a new and improved method for repairing and filling objects of fiberglass, metal and the like and for fabricating objects which may be easily and efficiently manufactured and marketed.

It is further object of the present invention to provide a new and improved method of repairing and filling of objects of fiberglass, metal and the like and for fabricating objects which is durable and stable.

An even further object of the present invention is to provide a new and improved method of repairing, filling and fabricating objects which is susceptible of a low cost of manufacture with regard to both materials and labor, and which accordingly is then susceptible of low prices of sale to the consuming public, thereby making such method of repairing, filling and fabricating economically available to the buying public.

Lastly, it is an object of the present invention to provide a new and improved method of repairing, filling and fabricating including the steps of providing a resin containing fiberglass, providing a polyester body fill material, providing a fibre strand body filler of a smooth formula, mixing the resin, polyester body fill material and fibre strand body filler, to form a first mixture. The next step is providing a liquid clear fiberglass resin hardener, followed by mixing the first mixture and the liquid clear fiberglass resin hardener to form a first composition. A further step is providing a cream body filler of a particular color. The final step is mixing the cream body filler hardener with the first composition to form a second composition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the descriptive matter in which there is illustrated preferred combination of ingredients of the invention.

BRIEF DESCRIPTION OF THE DRAWING

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
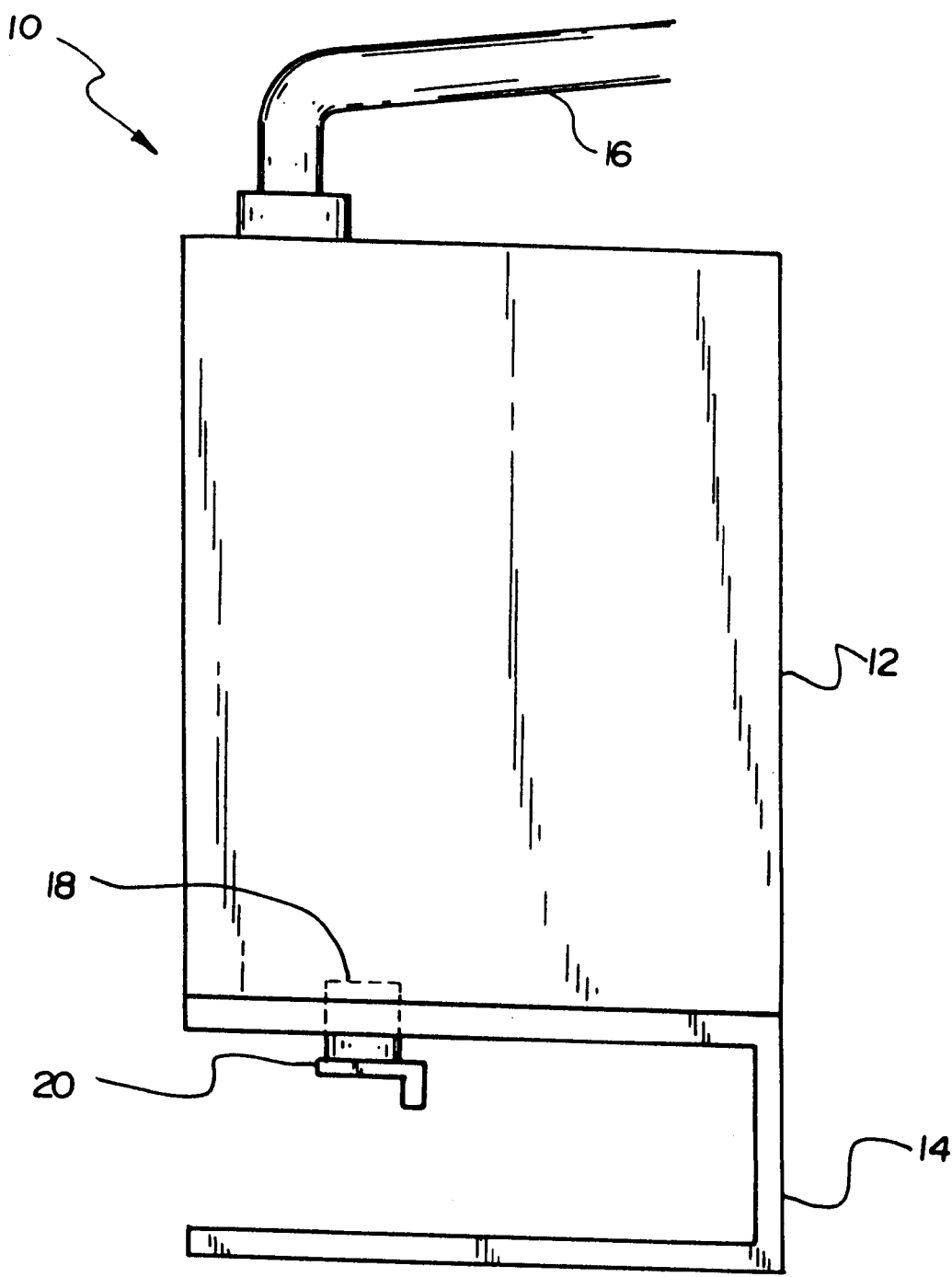
FIG. 1 is a perspective view of the preferred embodiment of the dispenser of the base mixture of the fiberglass repairing, filling and fabricating composition, prior to adding the hardeners, in accordance with the principles of the present invention.

The present invention is the method for repairing and filling in cracks and holes in objects and for fabrication of objects. The method is comprised of the steps of mixing specific ingredients. Such ingredients in their broadest context include a fiber glass resin, a fibre strand body filler of a smooth formula, a polyester body filler and hardeners. Such ingredients possess properties different from, or in addition to, those possessed by the several ingredients in common and cooperate with respect to each other so as to attain the desired objective.

Specifically, the present invention a new and improved method for repairing and filling in of cracks and holes in objects such as fiberglass, metal and the like and for fabricating objects uses ingredients that are made from a combination of commercially available products. The method includes the step of providing about twenty-five percent by weight of a liquid resin containing fiberglass, the resin preferably including styrene, unsaturated polyester and microscopic fiberglass particles; about twenty-five percent by weight of a polyester body fill material being comprised essentially of polyester resin, silica, styrene, talc and titanium dioxide; and providing about fifty percent by weight of a fibre strand body filler of a smooth formula being comprised essentially of calcium metasilicate, caster oil derivatives, milled fiberglass, polyester resin, styrene and talc. The next step in the method is mixing the resin, polyester body fill material and fibre strand body filler at room temperature between 65 and 85 degrees Fahrenheit to form a first mixture. Next a liquid clear fiberglass resin hardener is provided for controlling the viscosity of the mixture. The next step is mixing the liquid clear fiberglass resin hardener with the first mixture at room temperature between 65 and 85 degrees Fahrenheit to form a first composition having a viscosity greater than a viscosity of the first mixture. The higher the viscosity the faster the setting and drying time of the first composition. The lower the viscosity the slower the setting and drying time of the first composition. The next step is providing a cream body filler hardener of a particular color having a weight percentage dependent upon the weight percentage of the fiber filler material. Finally, the method includes the step of mixing the cream body filler hardener with the first composition at room temperature between 65 and 85 degrees Fahrenheit to form a second composition being created with the addition of a greater amount of cream body filler hardener that liquid clear fiberglass resin hardener. The second composition has a putty-like consistency.

To change the viscosity and activate the fiberglass resin a liquid clear hardener in added. The liquid clear fiberglass resin hardener will control the viscosity of the first mixture.

The cream body filler hardener has a weight percentage dependent upon the weight percentage of the fibre strand body filler of a smooth formula in the first mixture.

The final composition is produced and used on areas to be repaired. First the user must prepare the surface of the area to be patched. If a piece is missing, cloth must be used with the compound. The area to be patched is ground out and cleaned with a solvent for removal of grease and dirt. A metal container is cleaned with a solvent for removal of grease and dirt from the container. The container is then ready for use as a mixing bowl. The composition during preparation and curing should optimally be placed at room temperatures of 65 to 85 degrees Fahrenheit.

Generally the composition is prepared in 32 ounce, 64 ounce and 5 gallon quantities. When preparing 3.2 ounces of a first mixture within the mixing bowl, the first mixture will have 8 ounces of fiberglass resin, 8 ounces of polyester body filler and 16 ounces of fibre strand body filler of a smooth formula. A liquid clear hardener is added as a catalyst to the first mixture to form a first composition having a viscosity greater than a viscosity of the first mixture. The user determines the amount of liquid clear fiberglass resin hardener to use. In most instances the larger the area to be repaired the smaller the amount of liquid fiberglass resin clear hardener is added. The smaller the area to be repaired the larger the amount of liquid clear fiberglass resin hardener is added to the first mixture. The higher the viscosity the faster the setting and drying time of the first composition. The lower the viscosity the slower the setting and drying time of the first composition. The setting and drying time is important when looking to have a good patch job. The first mixture, prior to adding the liquid clear fiberglass resin hardener, is a liquid that can be pored into a mold for use in making various items of interest.

The second composition is created with the addition of a greater amount of cream body filler hardener than liquid clear fiberglass resin hardener. The second composition has a putty-like consistency. The second composition may be placed into a dispenser 10 as shown in FIG. 1. The dispenser has a container 12 seated on a stand 14. The container is coupled with an air hose 16 at one end and has a dispensing opening 18 at another end. The dispensing opening has a shut off 20 attached for controlling the flow of the second composition from the container.

Furthermore, the air hose allows pressurized air to force the second composition out of the container. The second composition can then be use to fill in the area to be patched. The second composition, once in the area to be patched, is allowed to set and dry for smoothing by sanding.

One example of how the second composition can be made according to this invention is:

EXAMPLE

| Ingredient | % by weight |
| --- | --- |
| fiberglass resin | 25 |
| polyester body filler | 25 |
| fibre strand body filler of a smooth formula | 50 |
| liquid fiberglass resin clear hardener | 1–10 |
| cream body filler hardener | 10–20 |

The present invention a method for repairing, filling and fabricating combines existing fiberglass materials to create a new composition through a new method with greater strength and durability. The method of the present invention will repair and harden in cracks, holes and damaged areas of an object with a fiberglass, metal or like body. The method of the present invention may also be used to fabricate skis, helmets and other fiberglass products. The present invention may be used on automobiles, walls and toys. The method of the present invention allows for easier and quicker fiberglass repair. Additionally, this method requires much less grinding and sanding to smooth the repaired or filled area or the fabricated object.

As to the manner of usage and operation of the present invention, the same should be apparent from the above description. Accordingly, no further discussion relating to the manner of usage and operation will be provided.

With respect to the above description then, it is to be realized that the optimum volume metrical relationships for the ingredients of the composition, to include variations of amounts of components by weight of the entire composition and manner of intermixing, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved method for repairing and filling in of cracks and holes in objects such as fiberglass, metal and the like consisting essentially of:

preparing a surface of an area to be patched by grinding out and cleaning with a solvent the area to be repaired and filled in for the removal of grease and dirt;

providing a cloth if a piece is missing in the area to be patched;

providing about twenty-five percent by weight of a resin containing fiberglass;

providing about twenty-five percent by weight of a polyester body fill material being comprised essentially of polyester resin, silica, styrene, talc and titanium dioxide;

providing about fifty percent by weight of a fibre strand body filler being comprised essentially of calcium metasilicate, caster oil derivatives, milled fiberglass, polyester resin, styrene and talc;

mixing the resin, polyester body fill material and fibre strand body filler at room temperature between 65 and 85 degrees Fahrenheit to form a first mixture;

providing a liquid clear fiberglass resin hardener for controlling the viscosity of the mixture;

mixing the liquid clear fiberglass resin hardener with the first mixture at room temperature between 65 and 85 degrees Fahrenheit to form a first composition having a viscosity greater than a viscosity of the first mixture, the higher the viscosity the faster the setting and drying time of the first composition, the lower the viscosity the slower the setting and drying time of the first composition;

providing a cream body filler hardener of a particular color having a weight percentage dependent upon the weight percentage of the fiber filler material;

mixing the cream body filler hardener with the first composition at room temperature between 65 and 85 degrees Fahrenheit to form a second composition being created with the addition of a greater amount of cream body filler hardener that liquid clear fiberglass resin hardener, the second composition having a putty-like consistency;

filling in the areas to be patched with the second composition;

allowing the patched area to set and dry; and smoothing the patched area by sanding.

\* \* \* \* \*